US012601884B2

(12) United States Patent
Song et al.

(10) Patent No.: US 12,601,884 B2
(45) Date of Patent: Apr. 14, 2026

(54) OPTICAL FIBER CABLE WITH TENSILE MATERIAL BETWEEN THE INNER REINFORCING PROJECTION

(71) Applicant: HYESUNG Cable & Communication INC., Iksan-si (KR)

(72) Inventors: Young Bin Song, Seoul (KR); June Hyong Kim, Suwon-si (KR)

(73) Assignee: HYESUNG Cable & Communication INC., Iksan-si (KR)

( * ) Notice: Subject to any disclaimer, the term of this patent is extended or adjusted under 35 U.S.C. 154(b) by 280 days.

(21) Appl. No.: 18/508,639

(22) Filed: Nov. 14, 2023

(65) Prior Publication Data

US 2024/0159980 A1     May 16, 2024

(30) Foreign Application Priority Data

Nov. 14, 2022     (KR) ........................ 10-2022-0151544

(51) Int. Cl.
G02B 6/44          (2006.01)
(52) U.S. Cl.
CPC ................................. G02B 6/4432 (2013.01)
(58) Field of Classification Search
CPC ............................ G02B 6/4431; G02B 6/4432
See application file for complete search history.

(56) References Cited

U.S. PATENT DOCUMENTS

| | | | | |
|---|---|---|---|---|
| 7,936,957 B1 * | 5/2011 | Puzan | .................. | G02B 6/4494 |
| | | | | 385/112 |
| 2001/0043781 A1 * | 11/2001 | Yokokawa | ........... | G02B 6/4431 |
| | | | | 385/102 |
| 2021/0389542 A1 * | 12/2021 | Kuhar | .................... | G02B 6/443 |

FOREIGN PATENT DOCUMENTS

| | | | | | |
|---|---|---|---|---|---|
| CN | 206505734 U | * | 9/2017 | | |
| DK | 174884 B1 | * | 1/2004 | .............. | H01B 9/02 |
| KR | 20040083926 A | | 10/2004 | | |

OTHER PUBLICATIONS

CN 206505734 U English translation (Year: 2017).*

* cited by examiner

*Primary Examiner* — Charlie Y Peng
(74) *Attorney, Agent, or Firm* — STIP Law Group, LLC

(57)          ABSTRACT

The present disclosure relates to an optical fiber cable with tensile material between the inner reinforcing projection, and more specifically, to minimize the increase in diameter even when various interior materials for strength reinforcement are built in, thereby ensuring durability. This relates to an optical cable equipped with a tension member between reinforcing protrusions inside the covering, which can be expected to have advantage effects such as reduced manufacturing costs and improving installation workability with a miniaturized structure.

5 Claims, 8 Drawing Sheets

【FIG. 1 】
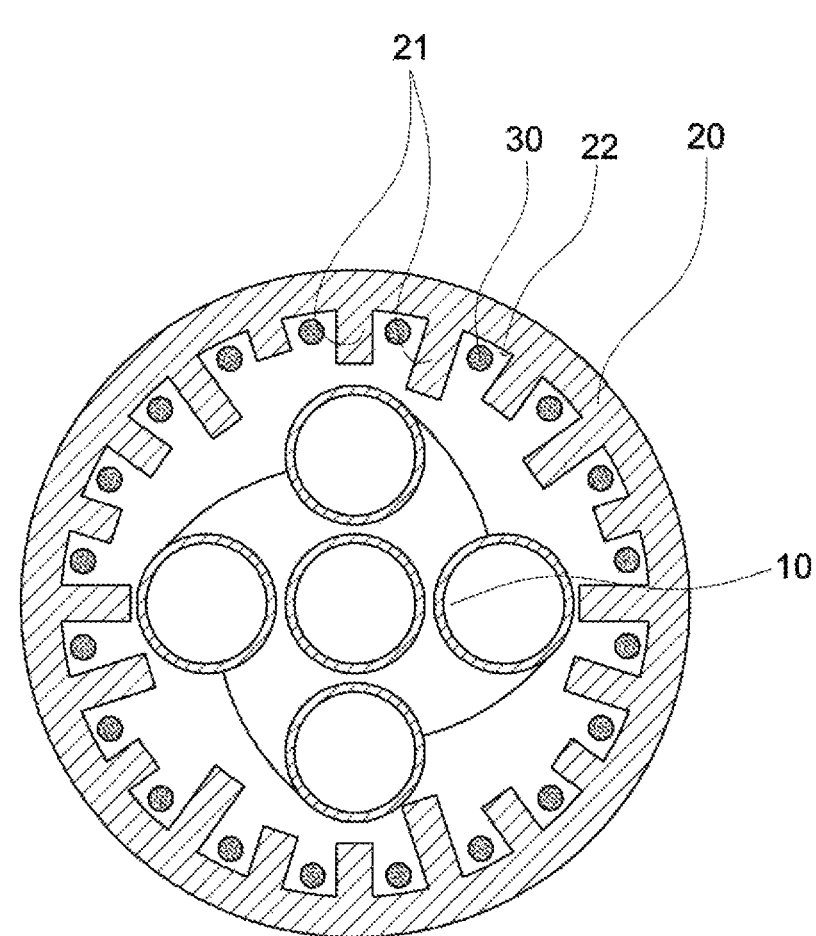

【FIG. 2】
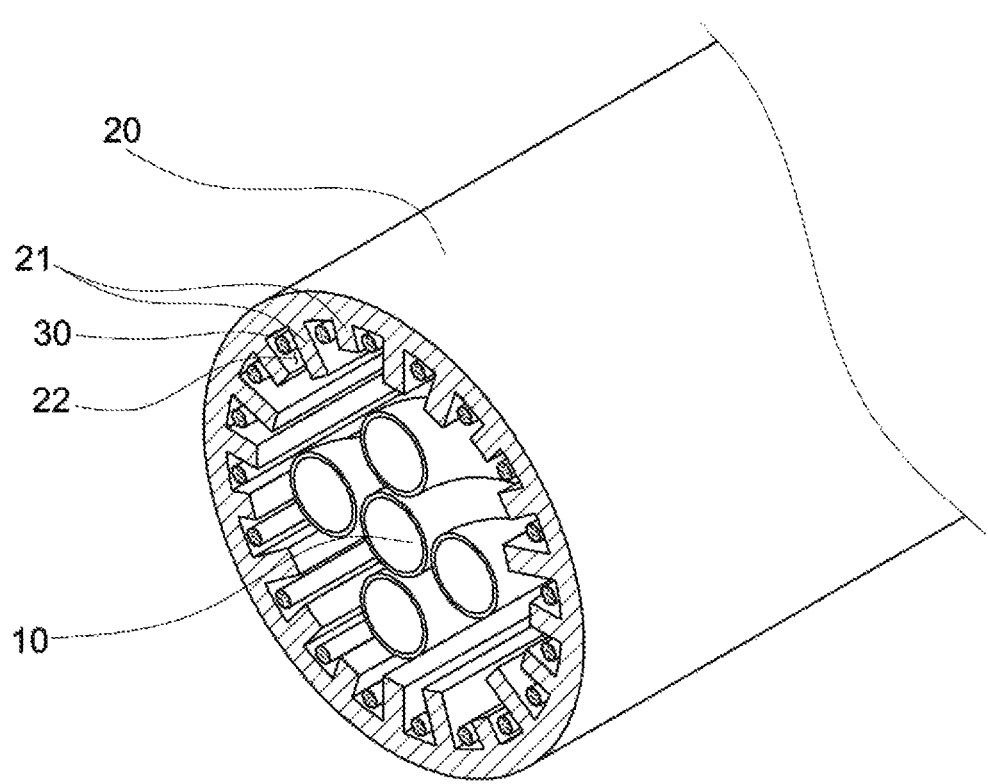

【FIG. 3】
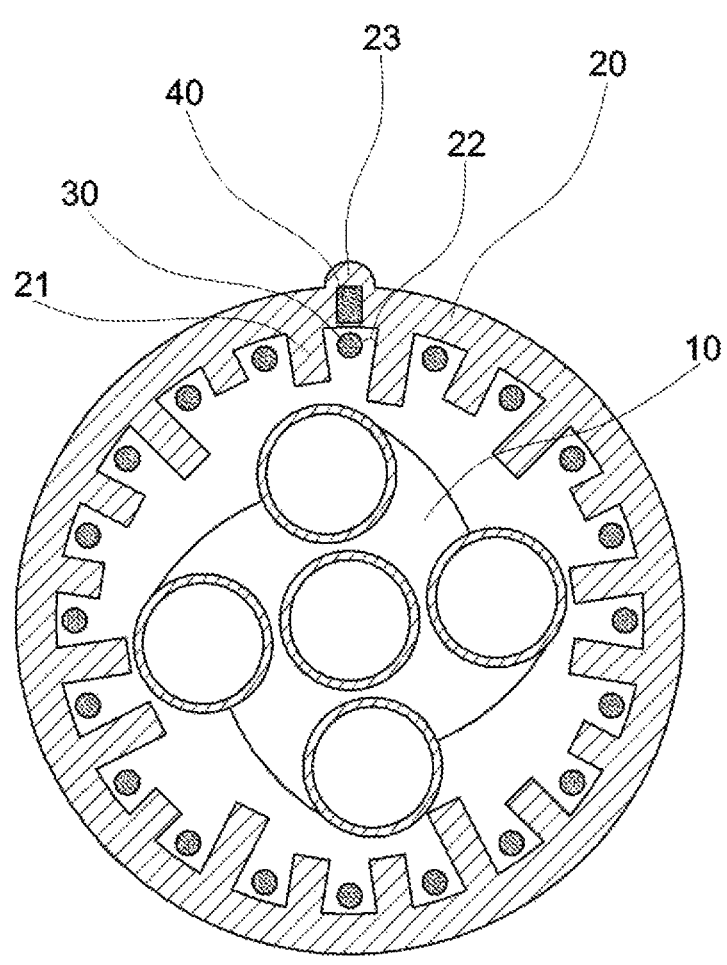

【FIG. 4】
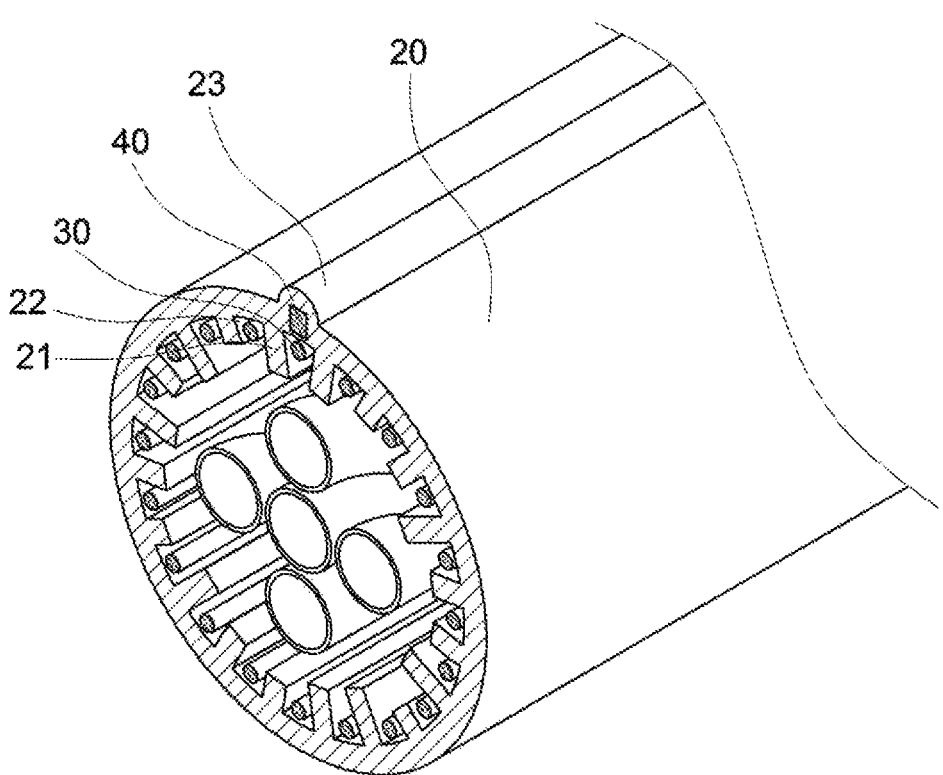

【FIG. 5】
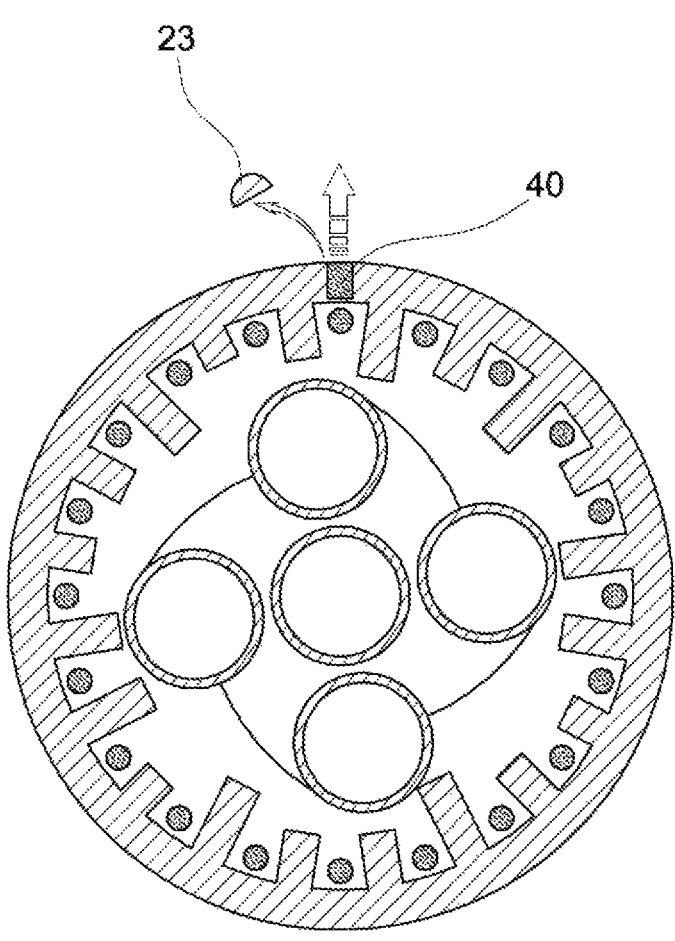

【FIG. 6】
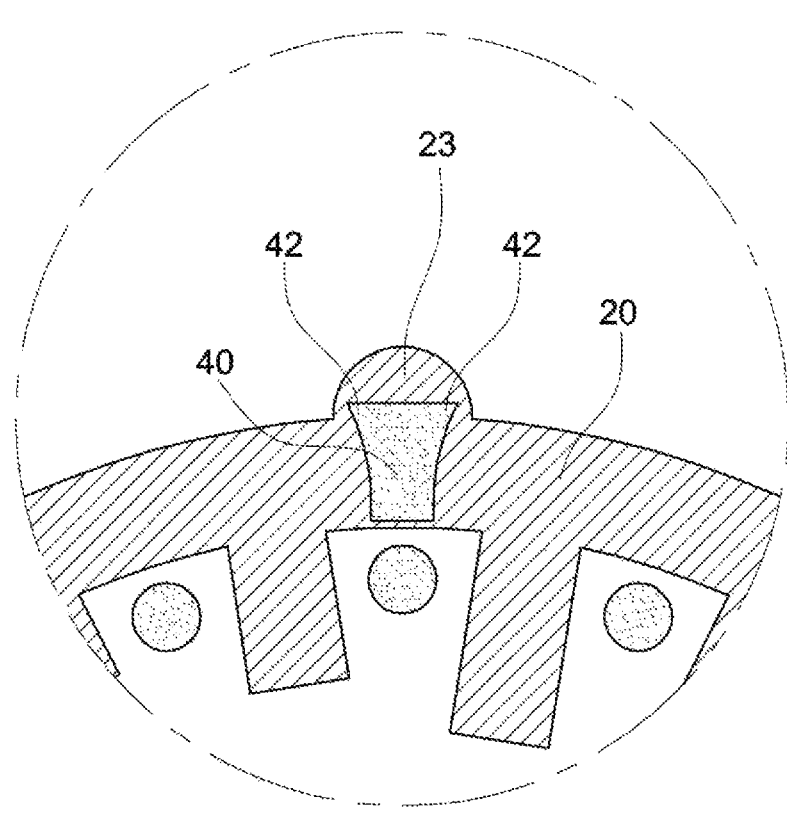

【FIG. 7】
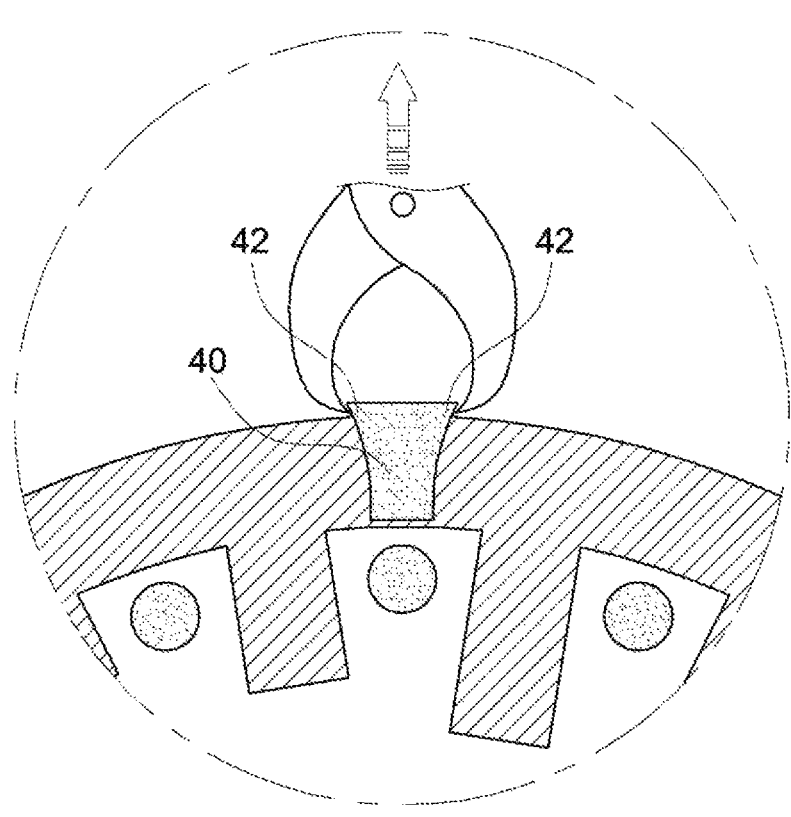

【FIG. 8】
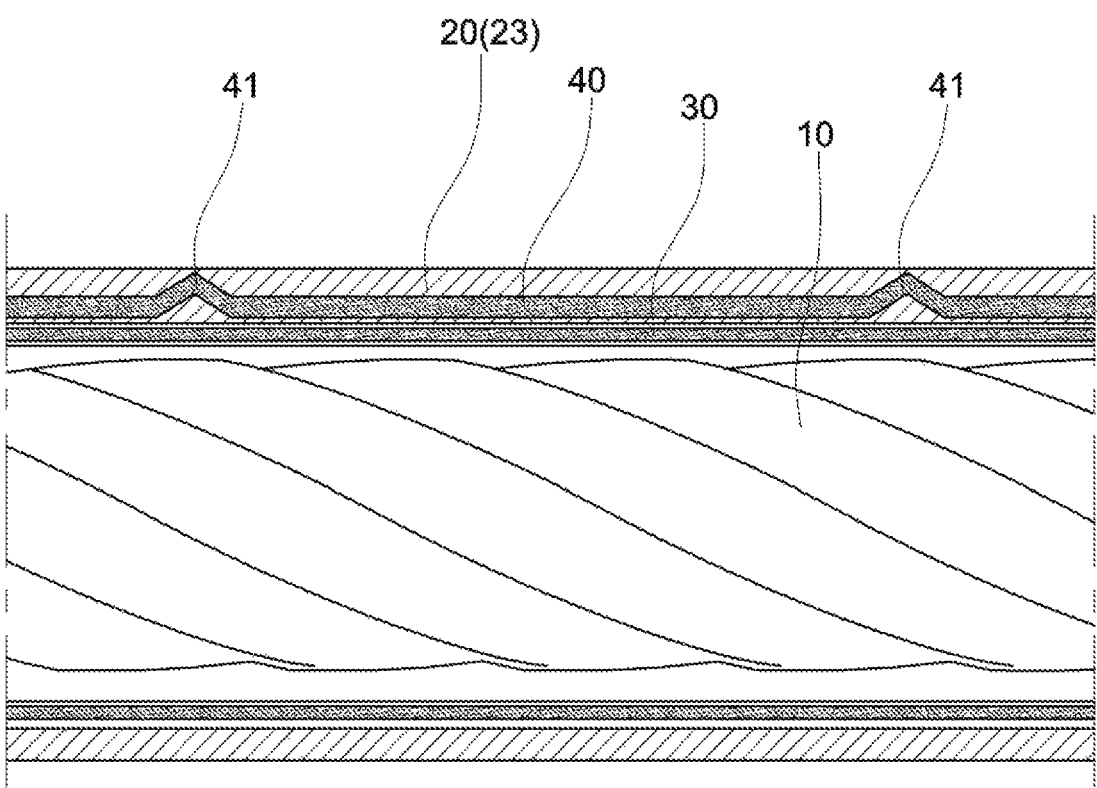

OPTICAL FIBER CABLE WITH TENSILE MATERIAL BETWEEN THE INNER REINFORCING PROJECTION

CROSS-REFERENCE TO RELATED APPLICATIONS

This application claims the priority of the Korean Patent Applications NO 10-2022-0151544, filed on Nov. 14, 2022, in the Korean Intellectual Property Office. The entire disclosures of all these applications are hereby incorporated by reference.

FIELD OF THE INVENTION

The present disclosure relates to an optical fiber cable with tensile material between the inner reinforcing projection, and more specifically, to minimize the increase in diameter even when various interior materials for strength reinforcement are built in, thereby ensuring durability. This relates to an optical cable equipped with a tension member between reinforcing protrusions inside a covering, which can be expected to have advantage effects such as reduced manufacturing costs and improving installation workability with a miniaturized structure.

BACKGROUND OF THE INVENTION

Optical fiber cables have advantages wide bandwidth, small diameter, high information transmission rate, broadband, low loss, no induction, and light weight compared to metal cables, so they are expanding their application range in place of conventional metal cable communication networks.

Among the many advantages of optical fiber cables, in particular, their characteristics, such as wide bandwidth, small diameter, high information transmission rate, wide bandwidth, and low loss, can transmit signals of different systems, such as telephone voice and multiple AV signals, at the same time, which has been widely used as means of transmitting and receiving various types of data, including comprehensive wired broadcasting (CATV), factories, buildings, and research institutes, and has now become the basis of a comprehensive information and communications network.

While it has these advantages, optical fiber cables are prone to damage due to external shocks such as tension or rapid bending, or stress such as pressure, due to the nature of the optical fiber base material. In particular, it is common to have a tensile material in the cable to compensate for the shortcomings of optical fiber mounted within the optical fiber cable due to its structure, which is very vulnerable to tension applied in the longitudinal direction.

Depending on the arrangement type, these tension members can be roughly divided into a core type disposed in the central core of the cable and a shell type composed of a structure surrounding the outside of the optical fiber.

On the other hand, in addition to the above-mentioned tension members, optical fiber cables are also equipped with waterproofing materials for waterproofing, separators for preventing short circuits between optical fibers, and shielding bodies for shielding, etc., and if the tension members are also reinforced, the diameter of the optical fiber cable is unnecessary. Problems are increasing rapidly.

PRIOR ARTS

Patent Document (Patent Document 0001) Korean Laid-open Patent Publication No. 10-2004-0083926

INVENTION OF CONTENTS

Subject to be Solved

The present disclosure is to solve the above-mentioned problems in the prior art, and minimizes the increase in diameter even when various interior materials for strength reinforcement are built in, thereby ensuring durability and creating a compact structure. The purpose is to provide an optical cable with a tension member between the reinforcing protrusions inside a covering, which can be expected to have beneficial effects such as reducing manufacturing costs and improving installation workability.

SUMMARY OF THE INVENTION

The present disclosure includes a core portion including a plurality of optical fiber bundles; a covering portion surrounding the core portion and having a plurality of reinforcing protrusions on an inner surface in a direction toward the core portion and reinforcing grooves between adjacent reinforcing protrusions; and a plurality of first tension members built into each reinforcement groove, as a means for achieving the above object.

In addition, it further includes a second tension member installed on the covering portion at a position eccentric from the first tension member, wherein the plurality of reinforcing protrusions are formed in the form of protrusions extending long along the longitudinal direction, and the first tension member and the second tension member are formed to extend long along the longitudinal direction to correspond to the length of the reinforcing protrusion, and an index is formed to protrude along the longitudinal direction at a position on the same line where the second tension member is installed on the outer surface of the covering portion.

In addition, the end of the second tension member facing the index is located at a boundary point between the outer surface of the covering portion and the index.

In addition, gripping pins are formed to protrude on both left and right sides of the end of the second tension member facing the index.

In addition, the second tension member is characterized in that a plurality of pull-out pieces are bent in a direction toward the outer surface of the covering portion at regular intervals along the longitudinal direction.

Invention of Effect

The present disclosure minimizes the increase in diameter even when various interior materials for strength reinforcement are built in, and as a result, not only durability is guaranteed, but also advantageous effects such as reduced manufacturing costs and improved installation workability can be expected due to the miniaturized structure.

BRIEF DESCRIPTION OF THE DRAWINGS

FIGS. 1 and 2 are diagrams showing a cross-sectional configuration of an optical cable according to an embodiment of the present disclosure.

FIGS. 3 and 4 are diagrams showing a cross-sectional configuration of an optical cable according to a second embodiment of the present disclosure.

FIG. 5 is a diagram illustrating a state in which an index has been removed in the embodiment shown in FIG. 3.

FIG. 6 is a view showing a modified example of the second tension member in the embodiment shown in FIG. 3.

FIG. 7 is a diagram showing the process of removing the second tension member.

FIG. 8 is a diagram for explaining a modified example of the second tension member, and is a diagram schematically showing the longitudinal cross-sectional configuration of an optical cable.

DETAILED DESCRIPTION OF THE EMBODIMENTS

The purpose, features and advantages of the present invention described above will become clearer through the following examples in conjunction with the attached drawings. The following specific structural and functional descriptions are merely illustrative for the purpose of explaining embodiments according to the concept of the present invention. Embodiments according to the concept of the present invention may be implemented in various forms, and the embodiments described in the present specification may be implemented in various forms. It should not be construed as limited to examples.

Since embodiments according to the concept of the present invention can make various changes and have various forms, specific embodiments will be illustrated in the drawings and described in detail in this specification. However, this is not intended to limit the embodiments according to the concept of the present invention to a specific disclosed form, and should be understood to include all changes, equivalents, and substitutes included in the spirit and technical scope of the present invention.

Terms such as first and/or second may be used to describe various components, but the components are not limited to the terms. The above terms are used only for the purpose of distinguishing one component from other components, for example, without departing from the scope of rights according to the concept of the present invention, a first component may be named a second component, and similarly, the second component may also be referred to as the first component.

When a component is said to be "connected" or "connected" to another component, it is understood that it may be directly connected to or connected to that other component, but that other components may also exist in between. It should be. On the other hand, when it is mentioned that a component is "directly connected" or "directly connected" to another component, it should be understood that there are no other components in between. Other expressions to describe the relationship between components, such as "between" and "immediately between" or "adjacent to" and "directly adjacent to", should be interpreted similarly.

The terms used in this specification are merely used to describe specific embodiments and are not intended to limit the present invention. Singular expressions include plural expressions unless the context clearly dictates otherwise. In this specification, terms such as "comprise" or "have" are intended to designate the presence of implemented features, numbers, steps, operations, components, parts, or a combination thereof, and are intended to indicate the presence of one or more other features or numbers, It should be understood that this does not exclude in advance the possibility of the presence or addition of steps, operations, components, parts, or combinations thereof.

Unless otherwise defined, all terms used herein, including technical or scientific terms, have the same meaning as commonly understood by a person of ordinary skill in the technical field to which the present invention pertains. Terms such as those defined in commonly used dictionaries should be interpreted as having meanings consistent with the meanings they have in the context of the related technology, and unless clearly defined in this specification, should not be interpreted in an idealized or overly formal sense.

Hereinafter, a first embodiment of an optical cable (hereinafter referred to as an optical cable) provided with a tension member between reinforcing protrusions inside the covering according to the present disclosure will be described with reference to FIGS. 1 and 2.

The optical cable in this embodiment can be broadly defined as including a core portion 10, a covering portion 20, and a first tension member 30.

The core portion 10 includes a plurality of optical fiber bundles. Although not shown, the optical fiber bundle can be coated with a tube, and the inside of the tube is filled with a filler so that the filler can be packed between optical fibers. The layering agent can use a waterproof material and can prevent moisture from entering by filling the empty space in the tube.

The covering portion 20 constitutes the outermost part of the optical cable and plays the role of protecting the optical fiber from external factors by surrounding the core part 10.

The covering portion 20 may be manufactured as an insulator made of a polymer-based polymer compound such as polyvinyl chloride, polyester elastomer (Hyt-rel), polyester, polyethylene, and nylon to which a foaming agent has been added, and the core portion 10 may be embedded in the cavity formed in the center of the covering portion 20.

A plurality of reinforcing protrusions 21 may be formed to protrude on the inner surface of the covering portion 20 in the direction toward the core portion 10. At this time, a reinforcing groove 22 may be formed between adjacent reinforcing protrusions 21.

Each of the reinforcing protrusions 21 and the reinforcing grooves 22 uniformly space the core portion 10 from the inner surface of the covering portion 20 so that the core portion 10 moves in a specific direction within the covering portion 20. In addition, it can perform the function of protecting the core portion 10 from shock and pressure applied from the outside by acting as a buffer between the core portion 10 and the covering portion 20.

In addition, each reinforcing groove 22 serves to support and accommodate the first tension member 30 or the second tension member 40, which will be described later, so that the first tension member 30 or the second tension member 40, the first tension member or the second tension member 40 can be accommodated without difficulty, allowing a narrow and limited space to be utilized more effectively, and further preventing the diameter of the optical cable from being unnecessarily increased. can be prevented from happening.

The reinforcing protrusion 21 may be formed integrally with the covering portion 20 from the same material as the covering portion 20 during the manufacturing process.

The core portion 10 is supported at a distance toward the center of the covering portion 20 by each of these reinforcing protrusions 21, and in particular. since its own elastic deformation can be allowed to some extent by reinforcing grooves 22 formed between each of the reinforcing protrusions 21, when pressure is applied from an unspecified direction, each reinforcing protrusion 21 is elastically deformed into the space of the adjacent reinforcing groove 22, thereby more effectively cushioning or cushioning external shock. A structure that allows for dispersion is in place.

In addition, since the inner surface of the covering portion 20 forms a wrinkled structure due to the reinforcing protrusions 21 and the reinforcing grooves 22, the inner surface of the covering portion 20 formed by the height difference due to the non-uniform protruding structure is equipped with a structure that can perform a shielding function against surface waves generated by currents flowing along the inner surface.

The shielding characteristics of each reinforcing protrusion 21 are shown in the multiplicative parasitic frequency band of a specific band frequency forming shielding by harmonic components generated from each reinforcing protrusion 21. Therefore, this structure is capable of exhibiting shielding characteristics in a wide band.

The protrusion height of each of the plurality of reinforcing protrusions 21 may be formed differently, and the shape of each reinforcing protrusion 21 and the spacing between adjacent reinforcing protrusions 21 may be set differently.

In this way, the inner surface has a somewhat complex wrinkle structure to minimize the influence of external interference.

The first tension member 30 is the constitution to increase the tensile strength of the optical cable, and has the structure built into at least one or more reinforcement grooves 22. Accordingly, each first tension member 30 may be uniformly distributed within the covering portion while being spaced apart from each other.

The first tension member 30 in this embodiment may be built into a corresponding location of each of the plurality of reinforcing grooves 22, and in this case, each reinforcing protrusion 21 and reinforcing groove 22 extends in the longitudinal direction of the optical cable, and it has a structure that extends long along the length, and the first tension member 30 also has a fiber structure that extends long along the longitudinal direction within the reinforcement groove 22 to correspond to the length of the reinforcement protrusion 21 and the reinforcement groove 22.

The cross-sectional shape of the first tension member 30 may have a circular or oval structure, and the material may be appropriately selected from among known materials showing excellent properties in tensile strength, such as steel wire, glass fiber, and reinforced plastic.

In this way, even if the first tension member 30 is built inside the covering portion 20, the first tension member 30 is not structured to completely surround and protect the outer surface of the core portion 10, but is disposed at regular intervals, and in particular, since the reinforcing protrusion 21 around the first tension member 30 itself can undergo a predetermined elastic deformation, it is possible to provide a predetermined ductility in the line of suppressing tensile deformation of the optical cable, and accordingly, the optical cable lower the hardness to ensure ease of installation. In addition, since the first tension member 30 and the reinforcing protrusions 21 are provided alternately, even if the covering portion 20 is cut with a cutter to remove the covering portion 20, the first tension member 30 remains in a specific portion. A structure is provided that allows the covering portion 20 to be cut more easily without interference.

Hereinafter, with reference to FIGS. 3 to 5, a second optical cable according to the present disclosure will be described. This embodiment has all the same configurations as the above-described embodiment, but there are some differences in that it further includes a second tension member 40, an index 23, etc., so the description below focuses only on the parts where there are differences.

The second tension member 40 not only functions as the first tension member 30 in the above-described embodiment, but is preferably made of a metal that is easy to detect, such as copper, to facilitate detection of the buried location and removal. In the case of the above-described embodiment, at least one of the plurality of first tension members may be configured as the second tension member of this embodiment to perform the role of the second tension member.

On the other hand, once the optical cable is buried, not only is it not easy to find the buried location, but even if the buried location is found, it is difficult to separate (remove) the covering part 20 for tasks such as intermediate branching and terminal connection of the optical cable. The work was not easy due to concerns about interference by various components built into the covering unit 20 and damage to the optical fiber due to poor operation of the stripping tool.

Therefore, in this embodiment, not only can the buried location be easily tracked, but also the covering separation work can be performed more easily without damaging the optical fiber.

More specifically, the second tension member 40 is a structure installed in the covering portion eccentric from the first tension member, and is not located in the reinforcing protrusions, reinforcing grooves, or cavities that constitute the covering portion, but is located in the covering itself, and It is installed so that an incision can be easily made in the covering area just by taking out the second tension member.

That is, a first tension member 30 may be disposed in each reinforcement groove 22, and a second tension member 40 may be built into the covering portion 20 itself.

Like the first tension member 30, the second tension member 40 may also be formed to extend long along the longitudinal direction within the covering portion 20.

In addition, even if the covering portion 20 is not cut separately, it is configured to determine the position of the second tension member 40 implanted in the covering part 20, and on the outer surface of the covering portion 20, an index 23 may be formed to protrude long along the longitudinal direction at a position on the same line where the second tension member 40 is embedded.

In other words, the second tension member 40 built into the covering portion can be located around the index 23, and the position of the second tension member 40 can be indirectly determined by referring to the index 23 protruding to the outside of the covering portion 20.

In this case, the second tension member 40 may be disposed as biased as possible in the direction of the index 23, or may have a structure extending toward the inside of the index 23 in some cases.

Preferably, the end of the second tension member 40 facing the index 23 is positioned at the boundary point between the outer surface of the covering portion 20 and the index 23, so that the index 23 is cut with a cutter, and then, the second tension member 40 can be easily exposed to the outside.

Therefore, for stripping, the worker partially cuts only the index 23 with a sharp cutter to expose the second tension member 40 to the outside, and then uses pliers to cut both sides of the exposed second tension member 40 to the outside. When gripped and pulled outward, the covering portion 20 is naturally cut by the second tension member 40 pulled outward, making it possible to easily open the inside of the covering part 20.

Meanwhile, as shown in FIG. 6, gripping pins 42 may be formed to protrude on both left and right ends of the end of the second tension member 40 facing the index 23, and accordingly, the cross-sectional shape of the second tension member 40 has a nail head shape with wide ends, when the second tension member 40 exposed to the outside by removing the index 23 is gripped with a tool such as pliers, the second tension member 40 can be gripped more easily and strongly.

Meanwhile, a plurality of pull-out pieces 41 may be formed to be bent in the second tension member 40 in a direction toward the outer surface of the covering portion 20 or the index 23 at regular intervals along the longitudinal direction.

Each pull-out piece 41 is a part for gripping the second tension member 40 using tools such as pliers during stripping work, and can be easily exposed to the outside just by making a predetermined cut in the index 23.

In this case, each of the plurality of pull-out pieces 41 is bent in the shape of a "∧" shape with the vertex located in the direction toward the index 23, so as to not only form a sufficient gripping area, but also has a structure that allows for easier exposure to the outside just a predetermined index 23 incision. In some cases, each pull-out piece 41 is configured to pass through the index 23 and be exposed to the outside, and each pull-out piece 41 is arranged at equal intervals, for example, at 1 m intervals so that the operator can roughly estimate the length of the optical cable by only referring to the gap between the pull-out piece 41 exposed to the outside.

The cross-sectional shape of the second tension member 40 may have various structures such as circular, triangular, or square.

Therefore, for stripping, the worker cuts only the index 23 part with a sharp cutter to expose the pull-out piece 41 to the outside, then grabs both sides of the exposed pull-out piece 41 with pliers and holds it to the outside. When pulled, the index 23 around the pull-out piece 41 is gradually cut by the second tension member 40 pulled outward, thereby opening the inside of the covering portion 20.

If necessary, a marker for guiding the position of the pull-out piece 41 may be engraved on the surface of the index 23.

The index 23 may be formed to protrude in the form of a hemisphere with a curved surface, and each pull-out piece 41 is provided to extend to a point where a portion is inserted into the index 23, and this allows the pull-out piece 41 to be more easily exposed inside the index that has been cut.

When stripping an optical cable of this structure, there is no need to insert the cutter deeply into the center of the optical cable, so damage to the optical fiber can be prevented, and the cut portion is made by cutting the index 23 that protrudes from the covering portion 20 to a predetermined height. Since it is limited to the area, excessive damage to the covering portion 20 can be prevented, and the incision is induced by naturally avoiding the first tension member 30, making it possible to easily proceed with the work without special professional skills or a dedicated stripper.

The embodiments of the present disclosure described above are merely illustrative, and those skilled in the art will understand that various modifications and other equivalent embodiments are possible. Therefore, it will be well understood that the present disclosure is not limited to the forms mentioned in the above detailed description. Therefore, the true scope of technical protection of the present disclosure should be determined by the technical spirit of the attached patent claims. Furthermore, the present disclosure should be understood to include all modifications, equivalents and substitutes within the spirit and scope of the present disclosure as defined by the appended claims.

SIGN OF DESCRIPTION

10: Core portion
20: Covering portion
30: First tension member
40: Second tension member

The invention claimed is:

1. An optical cable comprising:
a core portion including a plurality of optical fiber bundles;
a covering portion surrounding the core portion, the covering portion having
(i) a plurality of reinforcing protrusions protruding from an inner surface of the covering portion toward the core portion, the reinforcing protrusions extending along a longitudinal direction of the optical cable, and
(ii) a plurality of reinforcing grooves each disposed between adjacent reinforcing protrusions;
a plurality of first tension members, each of the first tension members built into a corresponding one of the reinforcing grooves and extending along the longitudinal direction to correspond to a length of the reinforcing protrusions;
a second tension member disposed in the covering portion at a position eccentric from the first tension members, the second tension member extending along the longitudinal direction; and
an index protruding from an outer surface of the covering portion and extending along the longitudinal direction, the index being located at a circumferential position corresponding to the second tension member.

2. The optical cable of claim 1,
wherein an end of the second tension member facing the index is located at a boundary between the outer surface of the covering portion and the index.

3. The optical cable of claim 2,
wherein gripping pins protrude from opposite sides of the end of the second tension member facing the index.

4. The optical cable of claim 2,
wherein the second tension member includes a plurality of pull-out pieces bent toward the outer surface of the covering portion at regular intervals along the longitudinal direction.

5. The optical cable of claim 1,
wherein the plurality of reinforcing protrusions includes at least two reinforcing protrusions having different protrusion heights, and wherein the reinforcing protrusions define at least two spacings between adjacent reinforcing protrusions that are different from each other.

* * * * *